Patented Sept. 16, 1952

2,610,933

UNITED STATES PATENT OFFICE 2,610,933

BRAZING FLUX

Louis E. Stark, Grand Island, N. Y., assignor, by mesne assignments, to Union Carbide and Carbon Corporation, a corporation of New York No Drawing. Application November 8, 1949, Serial No. 126,233

4 Claims. (Cl. 148—26)

This invention relates to a welding and brazing flux which substantially reduces or eliminates zinc fuming during welding or brazing operations with brass welding rods and the like.

Brass welding rods are copper base alloys in which the principal added constituent is zinc. Other elements are usually added to the alloy in smaller proportions to impart desired properties to the weld rod, welding or brazing operation, or the resulting weld. These may include, among others, tin and iron for weld hardness, nickel for improved weld to base metal bonding, and deoxidizers such as silicon, manganese, etc., all being well known in the art.

The zinc of brass welding rods tends to vaporize during welding, sometimes making the weld porous. This tendency is accentuated in brass rods containing a substantial amount of nickel. In addition, zinc fumes are hazardous to the health if inhaled.

The primary object of this invention is to substantially reduce zinc fuming during welding or brazing operations in which brass welding rods and the like are employed.

Most prior efforts to reduce zinc fuming have involved control of the composition of the welding rod. These efforts achieved a considerable degree of success, but are expensive and not completely effective. The present invention is based on the discovery that zinc fuming may be practically eliminated by employing a flux comprising zinc borate and an additional fluxing material (or materials) which lowers the melting point and increases the fluidity of the zinc borate.

Zinc borate alone, while effective to reduce zinc fuming, is stiff and viscous at welding temperatures, and it is therefore preferable to compound zinc borate with a substance which will reduce the melting point of the composite flux and cause it to flow evenly and smoothly at ordinary welding and brazing temperatures. Alkali-metal compounds tend to counteract the effect of the zinc borate and increase zinc fuming. They should therefore be kept to a minimum and preferably eliminated. Aside from the alkali-metal compounds, however, any of the conventional fluxing materials may be compounded with zinc borate provided they result in producing a composite flux with good fluidity at ordinary welding temperatures. Examples of such materials, which may be used alone or in part, are boric acid, ammonium borate, manganese borate, and the like. Boric acid is a particularly good additive for this purpose. In addition to having good fluidity at welding temperatures, it has a good cleaning action, and is readily available and inexpensive.

Zinc borate is especially beneficial when employed in amounts in excess of approximately 2% of a composite flux. With less than about 1% zinc borate in the flux, the reduction in zinc fuming is not appreciable. As the proportion of zinc borate in the flux increases to above about 10%, the molten flux becomes progressively more viscous and consequently more difficult to employ in welding or brazing because of its decreased flow characteristic, and it is therefore preferable not to exceed about 20% zinc borate. When boric acid and zinc borate are employed in a flux made according to this invention, the optimum fluidity and zinc fume suppression are achieved when from 96–94 parts of boric acid are added to 4–6 parts of zinc borate.

In place of zinc borate, appropriate amounts of zinc oxide and boric anhydride may be present in the flux, zinc borate being formed in situ during the welding operation.

A flux prepared according to this invention may be employed either by dipping the rod in the powdered flux material during the welding operation or by coating the rod during manufacture in any manner known to the art.

By "welding and brazing," as used herein and in the appended claims, is meant welding, brazing, surfacing, and the like wherein metals at least one of which is brass, are joined by an operation wherein at least the brass is fused.

I claim:

1. A welding and brazing flux substantially free of alkali metal compounds and containing 1% to 20% of zinc borate, the remainder material selected from the group consisting of boric acid, ammonium borate, and manganese borate.

2. A welding and brazing flux substantially free of alkali metal compounds and containing 1% to 20% of zinc borate, the remainder boric acid and incidental impurities.

3. A welding and brazing flux composed substantially of 2% to 10% zinc borate, the remainder boric acid.

4. A welding and brazing flux composed substantially of 4% to 6% zinc borate, the remainder boric acid.

LOUIS E. STARK.

REFERENCES CITED

The following references are of record in the file of this patent:

UNITED STATES PATENTS

| Number | Name | Date |
|---|---|---|
| 971,563 | Rockey et al. | Oct. 4, 1910 |
| 1,852,847 | Harrington | Apr. 5, 1932 |
| 2,199,440 | Lytle et al. | May 7, 1940 |
| 2,274,637 | Rooke et al. | Mar. 3, 1942 |
| 2,435,198 | Browne | Feb. 3, 1948 |